United States Patent [19]

Papee et al.

[11] E Re. 29,142

[45] Reissued Feb. 22, 1977

[54] COMBUSTIBLE COMPOSITIONS FOR GENERATING AEROSOLS, PARTICULARLY SUITABLE FOR CLOUD MODIFICATION AND WEATHER CONTROL AND AEROSOLIZATION PROCESS

[75] Inventors: Henry M. Papee; Alberto C. Montefinale; Gianna L. Petriconi, all of Rome, Italy; Tadeusz W. Zawidzky, Ottawa, Canada

[73] Assignee: Consiglio Nazionale delle Richerche, Rome, Italy

[22] Filed: May 22, 1973

[21] Appl. No.: 362,680

Related U.S. Patent Documents

Reissue of:

[64] Patent No.: 3,630,950
Issued: Dec. 28, 1971
Appl. No.: 777,581
Filed: Nov. 21, 1968

U.S. Applications:

[63] Continuation-in-part of Ser. No. 742,956, June 19, 1968, abandoned, which is a continuation of Ser. No. 444,923, March 22, 1965, abandoned, which is a continuation-in-part of Ser. No. 392,809, Aug. 28, 1964, abandoned.

[52] U.S. Cl. ..... 252/305; 149/43; 239/2 R; 252/186; 252/187 R; 252/188.3 R; 252/319

[51] Int. Cl.[2] ..... A01G 15/00; C09K 3/30; E01H 13/00

[58] Field of Search ..... 252/305, 319, 186; 149/43; 239/2 R, 2 S

[56] References Cited

UNITED STATES PATENTS

| | | | |
|---|---|---|---|
| 2,232,728 | 2/1941 | Pleasants | 252/319 X |
| 2,409,201 | 10/1946 | Finkelstein et al. | 252/305 X |
| 2,614,083 | 10/1952 | Bailar, Jr. et al. | 252/305 X |
| 2,633,455 | 3/1953 | Finkelstein et al. | 252/305 X |
| 3,044,911 | 7/1962 | Fritzlen | 149/43 X |
| 3,120,459 | 2/1964 | Coates et al. | 149/43 X |
| 3,257,801 | 6/1966 | Martinez et al. | 149/43 X |

*Primary Examiner*—Richard D. Lovering
*Attorney, Agent, or Firm*—George H. Riches and Associates

[57] ABSTRACT

A combustible composition for generating aerosols for the control and modification of weather conditions consisting of a readily oxidizable substance selected from the group consisting of aluminum, magnesium, alkali-metals and alkaline earth metals; an oxidizing agent selected from the groups consisting of:

(a) sulphur and sulphur yielding compounds; and
(b) organic and inorganic nitrates, alkali-metal and ammonium chlorates and perchlorates;

the molar ratio of the oxidizable substance to the oxidizing agent being between 1.5:1 and 3.5:1 and a stable hygroscopic solid which does not directly participate in the combustion process of the combustible composition, said hygroscopic solid being present in an amount up to 40% of the total weight of the combustible composition, the oxidizable substance, the oxidizing agent and the hygroscopic substance having a particle size in the range of from −140 to +270 mesh, and a primer initiating the combustion of said composition whereby during combustion, a finely dispersed aerosol smoke consisting of moderately hygroscopic condensation nuclei, and a non-hygroscopic gas are simultaneously evolved, said gas acting to disperse said nuclei.

11 Claims, 8 Drawing Figures

Inventors: Henry M. Papee,
Alberto C. Montefinale,
Gianna L. Petriconi
Tadeusz W. Zawidzki,
by
Attorney Inventors: Henry M. Papee,
Alberto C. Montefinale,
Gianna L. Petriconi,
Tadeusz W. Zawidzki
by
Attorney Inventors: Henry M. Papee,
Alberto C. Montefinale,
Gianna L. Petrôconi
Tadeusz W. Zawidzki
by [illegible]
Attorney Inventors: Henry M. Papee,
Alberto C. Montefinale,
Gianna L. Petriconi,
Tad W. Zawidzki
by Georgiev Pikes
Attorney

COMBUSTIBLE COMPOSITIONS FOR GENERATING AEROSOLS, PARTICULARLY SUITABLE FOR CLOUD MODIFICATION AND WEATHER CONTROL AND AEROSOLIZATION PROCESS

Matter enclosed in heavy brackets [ ] appears in the original patent but forms no part of this reissue specification; matter printed in italics indicates the additions made by reissue.

*This application is a continuation-in-part of our pending application Ser. No. 742,956 filed on June 19, 1968, now abandoned, which was a streamline continuation of our application Ser. No. 444,923 filed Mar. 22, 1965, now abandoned, and which was a continuation-in-part of our application Ser. No. 392,809 filed Aug. 28, 1964, now abandoned.*

This application is a continuation-in-part of our pending U.S. application Ser. No. 742,956, filed on June 19, 1968, now abandoned.

BACKGROUND OF THE INVENTION

This invention relates to combustible compositions, consisting of or comprising: mixtures of one or more easily oxidizable, powdered metals and one or more powdered oxidizing agents, which mixtures are able to generate aerosols to be employed, in particular, to control and/or to modify weather, such as to clear fogs, to modify clouds, to prevent hail.

This invention relates also to the process for the aerosolization of the reaction products of said compositions realized by oxidizing said metal/s with said oxidizing agents. More precisely, the compositions of the present invention are able to give, after "giant condensation nuclei" and/or "giant freezing nuclei" for the purposes stated above.

This invention further relates to an aerosolization process of various substances which are contained in mixtures comprising one or more easily oxidizable, powdered metals and powdered oxidizing agents, the aerosolization being the consequence of the combustion of the above defined mixtures and/or of the melting or vaporization of suitable salts embodied in the mixtures.

It is known that various inorganic and organic substances have been employed as smokes or dispersions for ice nucleation in super-cooled clouds; among these known substances mention is made of silver and lead iodides as well as the carbon dioxide.

the use of suspended or dissolved, powdered or vaporized hygroscopic substances is also known to induce coalescence of the water drops into clouds or in fog; we cite among these known substances, as potential agents, the activated sodium or potassium chlorides, that is, the sodium or potassium chlorides which show defective crystalline lattice, caused by ionizing radiations.

Various methods and devices have been used up to date to generate aerosols from the known substances; for example, burners fed with solutions of silver iodide in acetone have been used, or also containers containing said substances finely subdivided which is then dispersed by means of an explosive charge of gunpowder. The use of aircrafts, helicopters, aerostats and also rockets provided with a head charged with the product to be aerosolized and with a bursting charge suitable to realize the dispersion is also known for the purpose of transporting the substances to be aerosolized and the aerosolization devices in the atmosphere zones wherein a weather modification is desired.

Particularly the substances used up to this time, but also the known methods and devices for dispersing them to control and/or modify weather, show a number of disadvantages.

The silver iodide, which up to now has been considered the best artificial ice-nucleant and is the most commonly used for this purpose, besides being considerably expensive promptly decays in its nucleating activity under the action of both light or moisture. Further its high cost confines its employment in practice to dispersions having very small particles i.e. particles whose sizes are comparable with those of the colloidal water which constitutes the clouds; as a consequence said particles are not able to mechanically sweep away the colloidal water of the clouds.

Many other solid, hygroscopic substances, capable of coalescing water vapour in clouds, etc. have the disadvantages that the ground product, which must be finely subdivided (about 30 microns or less) and dry to avoid reagglomeration and caking phenomena shown by said hygroscopic particles in the presence of low moisture content. In particular, cumbersome apparatuses are needed to obtain sodium or potassium chlorides or generally speaking, alkali-metal halides provided with a defective crystalline lattice.

Also the methods now in use to produce aerosols present various disadvantages, since they require dispersing or burning devices or other bulky and/or heavy apparatuses which in turn require special equipment for their transport and functioning.

DESCRIPTION OF THE INVENTION

This invention provides a solution to the above mentioned difficulties, which are encountered in preparing, dispersing and activating the substances for purposes of cloud-condensation and fog-clearing. An object of the present invention is to provide a combustible composition consisting of cheap, easy to be found and to be employed substances suitable to be transformed into aerosols particularly useful for weather control and/or modification.

Another object of the present invention is to obtain aerosol constituted by giant condensation and/or freezing nuclei.

Further objects of the present invention are:

(a) the obtainment of giant, monodispersed nuclei, that is substantially uniformly sized nuclei;

(b) the obtainment of giant, monodispersed nuclei, whose sizes may be adjusted at will within wide limits;

(c) to provide a method for the preparation of the described compositions;

(d) to realize compositions of substances able to burst or to burn at a controlled rate therefore influencing respectively a limited or a wide zone of the atmosphere;

(e) to provide devices suitable to contain, to preserve and to burn said composition;

(f) to apply the devices, containing the composition according to the invention, to carriers for transporting them in the atmosphere zones fixed in advance;

(g) to utilize, when suitable, the combustible compositions also as propellents for the carriers.

The above mentioned and other objects will be evident to a man skilled in the art from the following description of the present invention.

The invention, in particular relates to a combustible composition for generating aerosols for the control and modification of weather conditions consisting of a readily oxidizable substance selected from the group consisting of aluminum, magnesium, alkali-metals and alkaline earth metals; an oxidizing agent selected from the groups consisting of:

(a) sulphur and sulphur yielding compounds; and (b) organic and inorganic nitrates, alkali-metal and ammonium chlorates and perchlorates;

the molar ratio of the oxidizable substance to the oxidizing agent being between 1.5:1 and 3.5:1 and a stable hygroscopic solid which does not directly participate in the combustion process of the combustible composition, said hygroscopic solid being present in an amount up to 40% of the total weight of the combustible composition, the oxidizable substance, the oxidizing agent and the hygroscopic substance having a particle size in the range of from −140 to +270 mesh, and a primer initiating the combustion of said composition whereby during combustion, a finely dispersed aerosol smoke consisting of moderately hygroscopic condensation nuclei, and a non-hygroscopic gas are simultaneously evolved, said gas acting to disperse said nuclei.

Among the more suitable metals to realize the present invention, we may indicate: Al (first of all), Mg, alkaline metals, alkali-earth metals and other readily oxidizable metals.

We have found that aluminum is the most suitable metal since, besides being relatively cheap, it may be considered inert at room temperature (this characteristic is an important factor for safety in the preparation and transportation of the described compositions), it yields remarkable heat of combustion which favours a good continuity of reaction and a good aerosol dispersion. Moreover it is available on the market in the suitable purity and particle size. However, magnesium, as well as other metals highly reactive at room temperature, may be used if suitable expedients are adopted, as for example that of incorporating and lining the composition granules with suitable inert and/or binding substances. One suitable expedient to prevent hazards is to separately heat the mg and oxidant to about 70° C. and on mixing, they are pasted with small amounts of melted paraffin and then amalgamated together. In practice, the pasting (mixing) is done on the presence of polymers which, after setting, "segmented charges" are obtained and the ingredients are safer to handle since the reactive, powdered mixtures are coated and immobilized by the solid polymers.

The metals, as already indicated for aluminum, are used in their finely divided, powdered form.

The oxidizing agents more suitable for the compositions according to the present invention must preferably meet the following requirements: to be stable at room temperature, to be easy to grind preferably hydrogen-free, able to react with the metal with gas development (particularly nitrogen) which favours aerosolization.

The oxidizing agents are preferably selected from the following classes:

(a) inorganic and organic nitrates; special mention is made of sodium and potassium nitrates which have proved particularly useful;

(b) sulphur or sulphur-containing substances; or also in the following ones:

(c) alkali-metal or ammonium chlorates and perchlorates;

(d) chlorinated hydrocarbons such as carbon tetrachloride and chloroform;

(e) peroxides.

However, substances belonging to the chlorates and perchlorates class which are shock sensitive, require inert binders for safe use is mixed and packed together with reducing agents. If mixed, we have found that aluminum sulfide, which forms during combustion of compositions containing powdered aluminum and sulfur, is a very good ice-nucleating substance. The above mentioned oxidizing agents must be finely ground in order to allow a regular combustion and a complete mixture utilization.

The additives considered in the present invention are solid, stable, hygroscopic substances, which do not directly participate in the combustion process of the combustible composition and are preferably inert to the products of combustion and have prolonged activity towards water; they, besides being used as "condensation" nuclei, also have the purpose of controlling combustion rate, developing gas in order to favour aerosolization, stabilizing the composition and the like; further, they are preferably selected in such a manner that they form active dispersions by aerosolization of the combustile compositions during the combustion process.

The additives are generally mixed with the compositions as fine powder or can constitute the core of the charge. Some of the additives, as hereinafter mentioned, must be placed in a core and kept out of direct contact with the composition.

The most efficient additives in the present invention are given in their order of preference selected from the group comprising sodium and potassium chlorides, used in particular as diluents to control the composition combustion rate, the weight percentage of the chloride in the mixture being up to 40% of the total weight of the combustible composition; sodium and potassium metals when they constitute the charge core and sodium azide. All the above quoted additives form active aerosols during the combustion process.

We have found that compositions according to the invention constituted by suitably proportioned mixtures of finely divided metallic aluminum, oxidizing agents such as dry, finely ground sodium or potassium nitrates and/or other inorganic substances, can burn at rates determined by the composition of the mixture and yield quantitatively hygroscopic aerosols which possess a prolonged fog condensation capacity at temperatures above 0° C.

In particular we have found, under microscope analysis, that the combustion products of the compositions comprising aluminum, nitrates, sodium or potassium chlorides, contain aerosolized sodium or potassium chlorides, whose crystal lattices are altered or defective; as already noted, the so altered chlorides show a remarkable electric activity allowing their application in weather control.

From what is above stated, it follows that the aerosolization process according to the invention, provides a new method, remarkably cheaper than that realized through electrical discharges or other methods, to produce activated sodium or potassium chlorides.

We have also found that if the proportion of aluminum powder in the above compositions is sufficiently high, i.e. for molar ratios of aluminum to nitrate of about 3.5 unreacted aluminum and sodium or potassium metals, resulting from the thermal decomposition of the present salts, become incorporated into the chloride-containing aluminum oxide aerosol spherules. After combustion of the mixture the unburned metals slowly react with water contained in the air by attracting it and releasing gas; but, since the process is slowed down by the oxide surrounding the metal (incompletely burned) which slowly reacts with the atmospheric humidity, the hygroscopic activity of the product is slowed down too and the action of the aerosol prolonged. Aerosol particles prepared in the beforementioned way, exhibit during the process of hydration a small electric-charge, due to electron ejection, which considerably increases their fog-coagulating power.

We have also found that the insertion into the combustible composition, comprising aluminum metal and chlorides, of a core containing a suitable substance which yields sodium or potassium as free metals by thermal decomposition, vastly enhances the water-fog coagulating powers of the aerosol, since substantial amounts of highly reactive sodium or potassium metals are occluded in the sodium chloride containing particles of aluminum oxide. Preferably the core consists of uncompounded alkali metal or a substance yielding free metals by thermal decomposition. Such a thermally decomposable substance is for example the sodium azide. The core may be a central tube containing a substance to be dispersed by heat generated by the reaction of the combustible composition. For example, the core tube may consist of a glass, resin impregnated glass fibers, a polymer or aluminum tube containing sodium or potassium azide, the container and its contents being embedded centrally in the combustible composition, care being taken that azide salt does not come into direct contact with the combustible composition to prevent the possibility of explosion which might occur after mixing and in particular, during desiccation of the charge by heat. This serves to enrich the aerosol in metallic unreacted sodium or potassium.

We have also found that combustible compositions containing for example finely divided aluminum metal, a suitable powdered oxidizer, such as sodium or potassium nitrate and a suitable amount of sulfur powder, can yield an aerosol of low hygroscopicity but of strong ice-nucleating action. In fact our tests have established that aluminum sulfide, formed in the reaction acts as a very active ice-forming substance from supercooled water; combustible, sulfur-containing compositions, such as above described, gave excellent results in this sense.

The composition preparation is realized in an anhydrous ambient, by drying the oxidizer and the additive and then milling them up to a very fine powder passing for instance through a sieve containing 140 and preferably 270 mesh; the powder thus obtained is admixed with the powdered metal (which has been prepared as particles having an average 20 microns diameter), in the presence of a suitable solvent, for example acetone, which wets the powdered substances, dissolving the fat traces sometimes covering the components. The paste is then introduced and dried in containers, hereinafter described, or it is extruded, after admixing with suitable binders in suitable shapes ready to be charged into dispositives or to be used in other manners as hereinafter described. The dispositives comprise: a container able to contain and to preserve the composition, the composition and one or more priming devices. The container is generally closed on one end and open on the other; in the case that the composition has to burn at a controlled rate, the length and the diameter of the container are settled respectively according to the desired duration of burning and to the amount of aerosol to be generated per unit time. In the case that the composition contains a metal excess with respect to the oxidizer, the container acts, by burning, as a shield of the fire zone, against atmospheric oxygen so preventing the oxidation of the metal excess.

The container may be made of suitable material inert at room temperature, water-proof, and of a size suitable for the particular use, for example, tubular segments made of suitable metals or of glass-fibers impregnated with suitable resins may be used. In particular we have found that by employing thin-walled containers made of aluminum or anticorrosive, high-percentage aluminum, aluminum-alloy, they are burned during the composition combustion so realizing both the advantageous effects of producing other active aerosols and of avoiding the damages caused by eventual relapse of the container if the charge is burned aloft. A suitable container for this purpose is a tube made of anti-corrosive aluminum, 3.5 cm. in diameter, 1 mm. wall thickness and 25 cm. in length, the bottom of which is welded closed. It is to be understood that the foregoing dimensions are given by way of illustration and is not to be taken as a limitation since it will be apparent that other sizes of tubes may be employed.

Similar results can be obtained also employing containers of suitable magnesium alloys; pure magnesium, unless protected with coatings, is not suitable for this purpose, due to its reactivity.

The container, after being charged with the paste, is heated at a temperature suitable to solvent and moisture evaporation and then is cooled. The priming device is then introduced and the container open-end is tightly closed.

If a delayed aerosolization is desired, which may be obtained with a controlled composition combustion rate, the paste is uniformly packed in the container; in this case the primed charge can be constituted by gunpowder introduced above and in contact with the paste, wherein a fuse is immersed; the container sealing may be realized for example with a paraffin, tar or polymer plug wherefrom a fuse emerges.

If, on the contrary, an instantaneous aerosolization is desired, the charge in the container may be suitably shaped, for example by shaping it suitably hollow, compressed and primed with a suitable priming device.

The containers charged with dispersing aluminum compositions and primed as described, may be used immediately as aerosols generators, or may be safely handled, transported and/or stored for long periods of time, without deterioration.

The devices, prepared as above described, can be used as follows:

(a) They can be used at suitable places on the ground, vertically with fuse up, initiating the dispersion by igniting the fuse;

(b) they can be transported and ignited where desired in the atmosphere, by introducing them as rocket-nose inorifices made in the front part of small inexpensive rockets.

We have quite successfully tried out in the field both of the above applications; however, any other application means, which, under the circumstances, may be more suitable to transport the devices in the atmosphere zones where the compositions according to the present invention have to be aerosolized, is equally comprised within the ambit of the invention. For example, the devices may be dropped or towed behind from airplanes in the clouds and here ignited; alternatively the compositions of the invention may be used to fill suitable shells for mortars and then sent and ignited in the clouds, with possibly a larger degree of accuracy than could be obtained using small pyrotechnic rockets.

Some interesting characteristics of the compositions object of the present invention are shown in the accompanying drawings, which summarize in part our tests.

Figure 3:
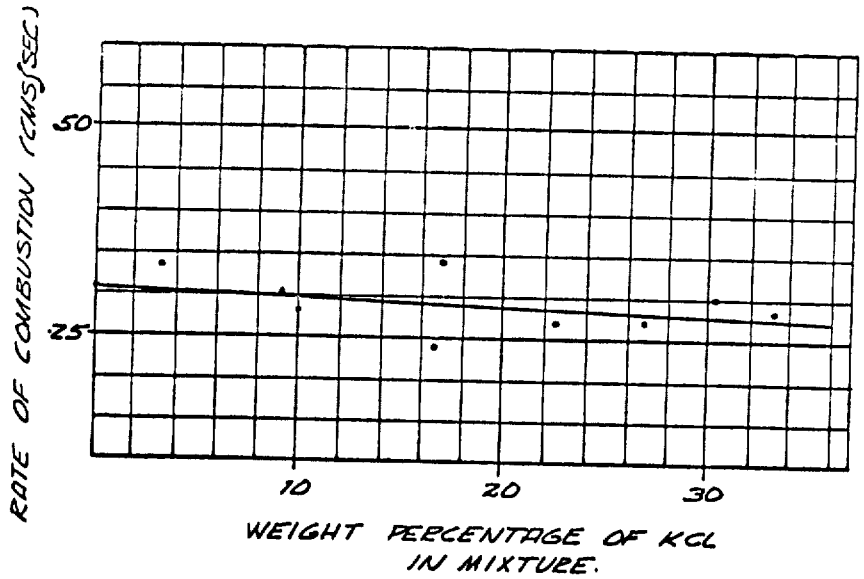
Figure 4:
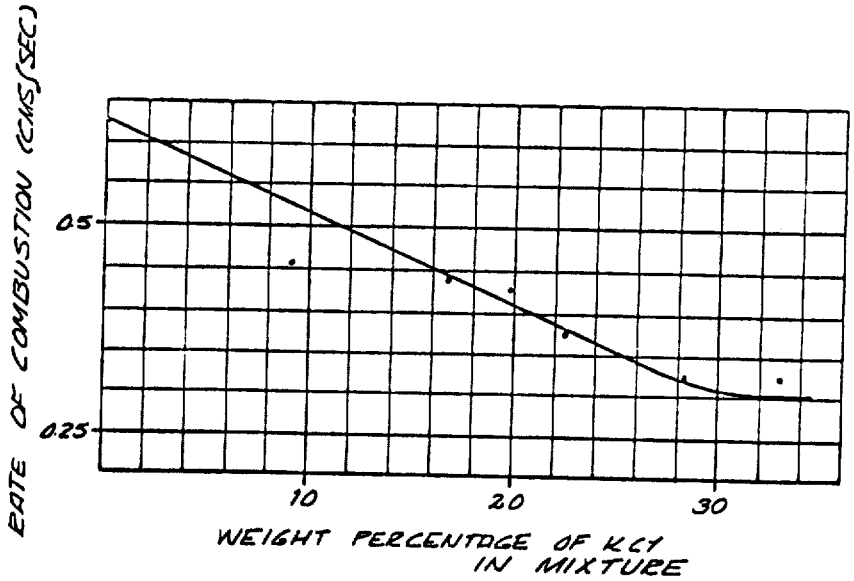

FIGS. 3 and 4 show the slope of the combustion rate plotted against the percentage of the potassium chloride additive contained in mixtures aluminum, potassium nitrate and potassium chloride. The mixtures of FIG. 3 were packed in tubes of 13.7 mm. diameter, while the mixtures of FIG. 4 were not packed and were contained in tubes of 9 mm. diameter. The molar ratio aluminum to potassium nitrate was of 3.5:1 in both cases.

Figure 5:
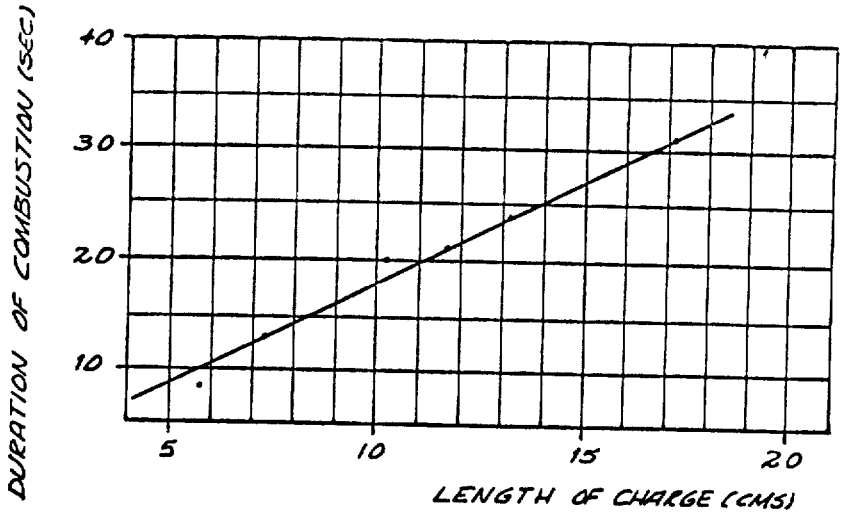

FIG. 5 shows the slope of the combustion time plotted against the tube length, for loosely packed aluminum and potassium nitrate mixtures ratio 3.5:1, contained in 9 mm. diameter tubes.

Figure 6:
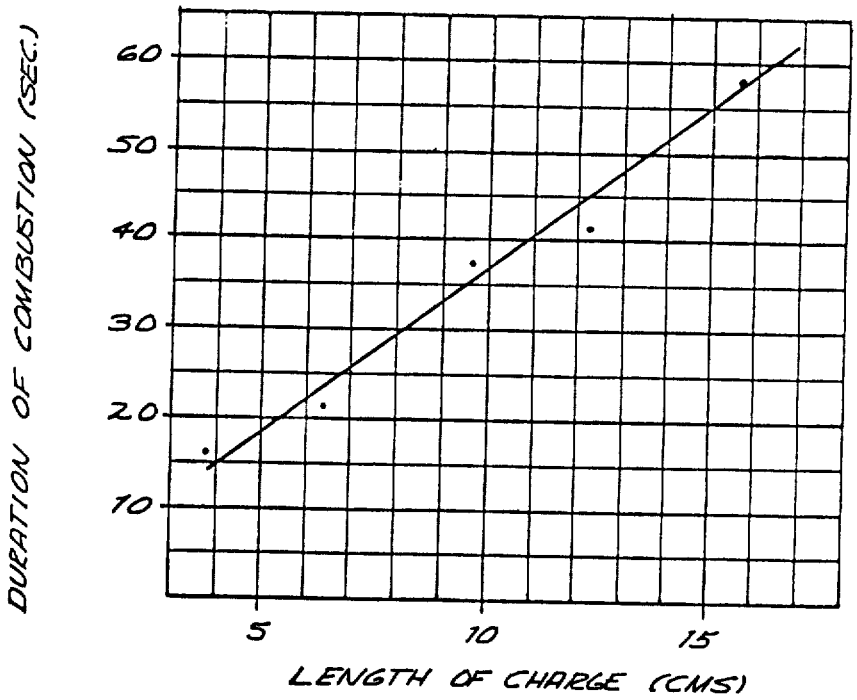

FIG. 6 shows, as above, the duration of combustion for aluminum, potassium nitrate and potassium chloride mixtures in molar ratio $Al:KNO_3:KCl=3.5:1:1.6$ contained in 13.7 mm. diameter tubes.

Figure 7:
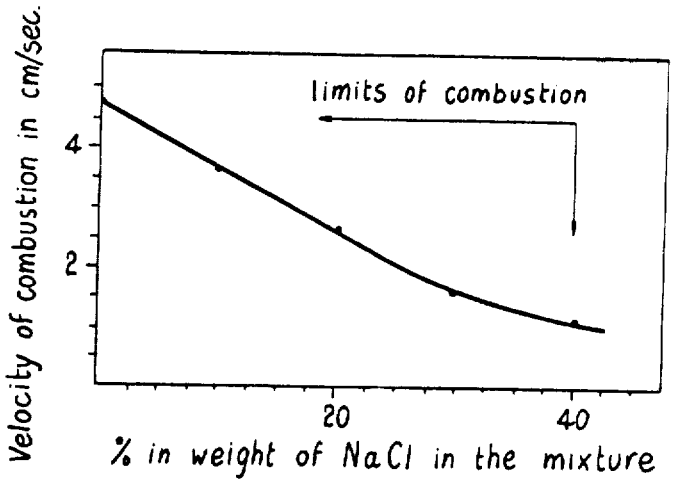

FIG. 7 shows the slope of the combustion rate plotted against the percentage of sodium chloride contained in the mixture, for mixtures magnesium-sodium nitrate, in molar ratio $Mg:NaNO_3=8$, amalgamated with 15% of total weight of paraffin.

Figure 8:
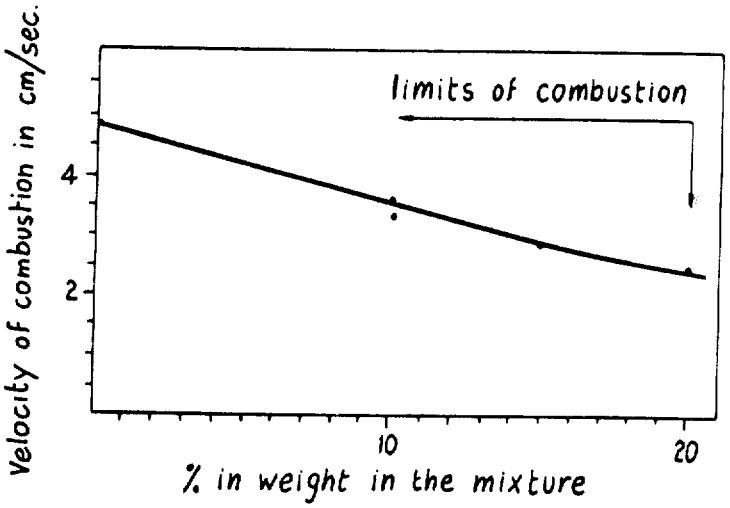

FIG. 8 shows the slope of the combustion rate plotted against the percentage of sulfur in the mixture, for mixtures of magnesium and potassium nitrate, where the molar ratio $Mg:NaNO_3=9$ amalgamated with 15% of total weight of components of paraffin. The compositions giving the desired combustion rate or, for a given composition, the duration of the combustion in dependence of the charge length, can be selected through the graphs shown in the figures or other similar ones. As already said the containers diameter packed with a given composition, determines the aerosol amount produced per unit time.

Figure 1:
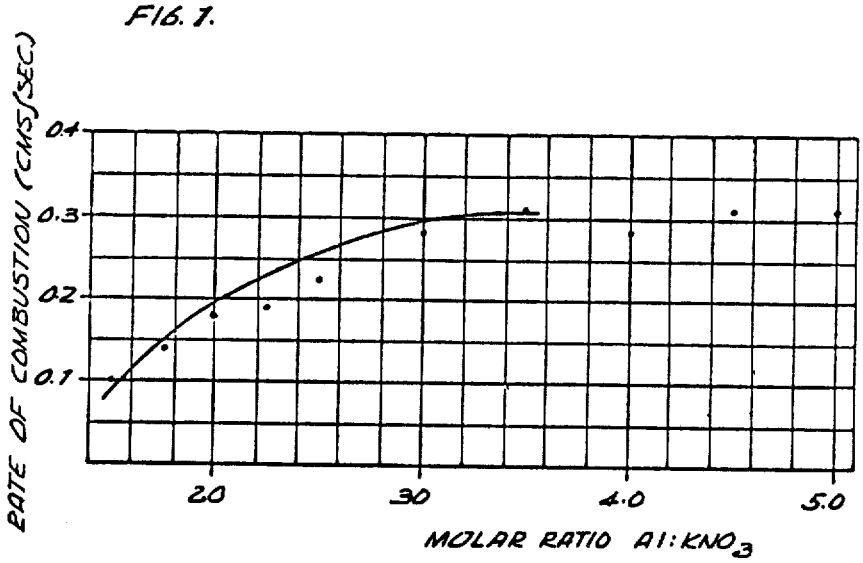
FIG. 1 shows the slope of the compositions combustion rate plotted against the molar ratio of the components, for loosely packed compositions constituted by aluminum and potassium nitrate. These tests are performed in aluminum cylinders of 9 mm. diameter.
Figure 2:
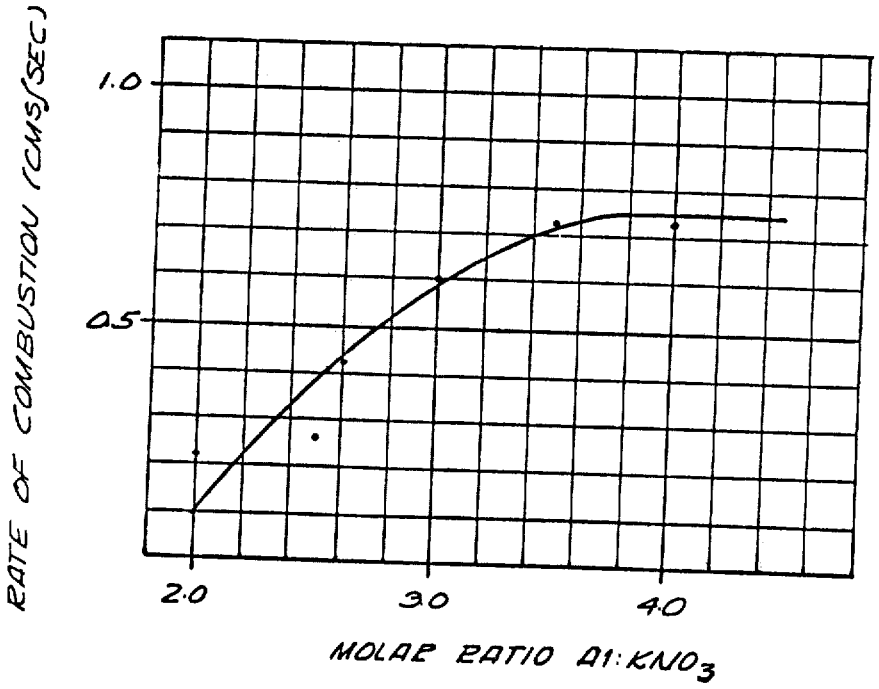
FIG. 2 shows graphically the results of tests similar to the preceding ones, performed on the same compositions after sinterization thereof; the apparent density of the so prepared compositions was about 1.1 g./cm$^3$.

FIGS. 1 and 2 reveal usable molar ratios $Al:KNO_3$ ranging from 1.5:1 to 3.5:1.

The present invention is illustrated by the following examples which do not limit the same.

EXAMPLE 1

A paste made of 120 gms. of powdered aluminum metal of about 20 microns in average particle size diameter, and of 100 mgs. of sodium nitrate added with 70 gms. of sodium chloride, which were ground to pass through an ASTM standard sieve of 270 mesh × inch$^{-1}$, was amalgamated mechanically in the presence of small amounts of acetone, loaded into a tube of anticorrosive aluminum, 3.5 cm. in diameter, 1 mm. wall thickness and 25 cm. long, the bottom of which was welded closed. This was followed by stepwise desiccation in a stove for a period of about 4 hours with the temperature increasing from about 60° to 130° C. The charge was thereafter cooled in the open, primed with gunpowder and fuse, and sealed. This type of standard charge which burned for about 30 seconds and dispersed about $10^{10}$ "condensation nuclei," was used on frequent occasions on static, "warm" valley clouds in mountains, and it brought about invariably the temporary dissipation of such clouds in a volume of half a cubic kilometer of air, approximately. The action of the aerosol consisted in generating relatively large hygroscopic particles ("giant nuclei") which coagulated the fog when introduced above it. Optical "rainbow effects" indicating formation of large, monodisperse droplets at the expense of the fog, could be noticed under direct sunlight illumination of the top of the cloud, whenever the aerosol was used. Observation of valley-cloud dissipation were confirmed by lapse photography.

Charges, such as described above, were fitted as nose-cones into small, pyrotechnic rockets of 1000 and 3000 meters vertical range respectively. These were fired into congested cumuli, and the dispersion of the aerosol within the cloud led to a speedy modification of the same, often followed by local precipitation, as monitored by photography from a distance and at regular time-intervals, as well as by monitoring downwind from the site. The above experiments were carried out at a suitable time of the year from a mountain ridge 1500 meters high. This was about the height of the cloud-base at the time.

EXAMPLE 2

A paste made of 100 gms. of powdered aluminum metal, about 20 microns in average particle-size diameter, and of 50 gms. of fine sulfur powder and 80 gms. of sodium nitrate which was ground to pass through an ASTM standard sieve of 270 mesh × inch$^{-1}$, was amalgamated mechanically in presence of small amounts of acetone, loaded into a tube of anticorrosive aluminum alloy 3.5 cm. in diameter, 1 mm. wall thickness and 25 cm. long. This was followed by stepwise desiccation in a stove with the temperature increasing from about 60° to 130° C., cooling, priming with gunpowder and fitting with a fuse, after which the tube was sealed.

Charges of this standard type were fitted as nose-cones into small pyrotechnical rockets of 1000 and 3000 meters vertical range respectively. At suitable times and with observation both from a distance and downwind from the site, as well as by lapse-photography, available, those rockets were fired into supercooled cumuli, preferably in groups of 2 (1000 and 3000 meters of range units), at the same time, and in conditions of a natural, orographic up-draft. Fast glaciation of the cumuli followed promptly (about 20 minutes) and resulted, on frequent occasions, in precipitation on the ground. Those experiments were again carried out from a mountainous ridge, 1500 meters above sea level. Glaciation and changes in clouds were invariably observed from a suitable distance: glaciation was initially localized to the zone of aerosol dispersion, but it often spread, at otherwise suitable conditions, with time over quite vaster areas of the sky. The highest temperatures of supercooled clouds, at which success was obtained, was of about −4.0±1° C., in agreement with laboratory measurements. No iodine-bearing substances were contained in charges used at any time.

EXAMPLE 3

The results of tests performed on compositions on the base of magnesium metal are reported hereinafter.

The compositions were constituted by:

Coarse commercial Mg powder, of particle size:

| Mesh/inch: | Percent |
|---|---|
| −35 | all |
| +140 | 87 |
| +270 | 9 |
| −270 | 4 |

$NaNO_3$ oxidizer, which was desiccated in an electric stove for 24 hrs., at 140° C., and ground to −140 + 270 mesh, ASTM, as well as of dried NaCl additive (same size) or fine sulfur powder.

The following is the description of some aerosolization tests:

(a) Mixtures, with gramme-molecular ratios of:

$Mg:NaNO_3=10; 8; 4$ were amalgamated at about 70° C. with 15% of total weight of dry reagents, with fused paraffin, and packed tightly, after cooling into tubes made of an anticorrosive aluminum alloy, 15 mm. diameter, 1 mm. wall thickness and 20 cm. long. After ignition by means of a suitable fuse, those mixtures burned very lively and at a uniform rate of about 5 cm. × $sec^{-1}$. Aerosol collected on greased microscopic slides, was found to consist of non-symmetrical aggregates of magnesium-oxide, of low hygroscopicity, as well as of finely subdivided alkali. No occluded metal could be found in the aggregates. Unlike in the case of aluminum compositions the heat of combustion was here quite moderate, hence the oxide was not fused and the aluminum container remained intact. Lack of interaction of the aerosol with water indicates here the absence of magnesium nitride.

(b) Mixtures, at gramme-molecular ratios of:

$Mg:NaNO_3=8$ were added with sodium chloride, and amalgamated with 15% of total weight of dry reagents, of fused paraffin, at about 70° C. Those mixtures, when tightly packed and burned in containers such as described under (a), yielded a smoke of MgO and alkali, as well as particles of sodium chloride; hence it is thought that this could be a way of dispersing hygroscopic salts. Observations, such as described under (a) showed that here again the heat generated was relatively low.

FIG. 7 shows rates of burning of those probes, against the percent of total weight in NaCl, of the mixture. Lack of inter-action with water indicates here too the absence of magnesium nitride, in the aerosol.

(c) Mixtures, at gramme-molecular weight ratios of $Mg:NaNO_3=8$, were added with sulfur powder, and amalgamated with 15% of total weight of dry reagents, of fused paraffin, at about 70° C. Those, when tightly packed and burned (with rates shown in FIG. 8) in containers such as described under (a), yielded a smoke of MgO and alkali, which contained large amounts of magnesium sulfide. The heat evolution was much higher here than in the probes (a) and (b) as revealed by microscopic examination of aerosol captured on greased slides which showed a fair amount of used spherules of magnesium oxide, which, in turn, contained coloured magnesium sulfide. The aerosol prepared in this manner nucleated ice at −9° C. Furthermore, since the magnesium sulfide reacts slowly with atmospheric moisture, this combination could probably be used as a source of hygroscopic nuclei. Combustible compositions based on Mg are quite lighter (per unit volume) but they would generate less heat (per unit volume) than their aluminum counterpart.

(d) Combustion of tightly packed candles of the three types above described, but prepared in tubes made of an anticorrosive aluminum alloy, which were welded closed at the bottom ext. diameter 3.5 cm., wall thickness 2 mm., and 25 cm. long, was carried out in order to confirm the possibility of using larger charges in practice. The charges contained approximately 200 gms. of solid mixture each a molar ratio of $Mg:NaNO_3=8$; 15% of dry-solid weight in paraffin and: no additive, 20% NaCl, and 15% S, respectively. The charges burned fast and with rates in agreement with those measured in the laboratory, and projected burning sparks of magnesium into the air. The same favourable combustion effect was obtained upon igniting, pyrotechnically, a similar charge contaning sodium chloride, which was sent to an altitude of about 1000 meters by means of a pyrotechnical rocket.

EXAMPLE 4

This example shows the results of dispersion tests performed with various chemical substances, by means of Al-$NaNO_3$ compositions.

Up to 300 gms. of combustible composition charges, consisting of finely powdered Al metal and of dry $NaNO_3$ (−140 + 270 mesh/inch) of molar ratio:

$Al:NaNO_3=3:1$ were mechanically mixed in presence of small amounts of acetone, and compressed into tubes made of an anti-corrosive aluminum alloy, which tubes were welded closed at one end, and were of 3.5 cm. ext. diameter, 2 mm. wall thickness and 25 cm. long. A central hole was then bored through the paste and a core made of a tube of anticorrosive Al, 20 cm. long, 1.2 cm. ext. diameter, 1 mm. wall thickness, which tube was welded closed at the bottom and tightly packed with a dry substance to be dispersed, such as those mentioned in the table below and sealed on the top with paraffin, was pressed into the central void in the charge paste, which paste was previously desiccated stepwise in an electric stove, until 140° C. was reached. The duration of desiccation was of 5 hours, starting with 70° C., the charges were kept at 140° C. for 2 hrs. The charges thus prepared were thereafter primed with gunpowder and fused and sealed. Charges thus prepared burned or exploded with violence, developing very high temperatures, whereby all metal parts and cores underwent, by reaction with the oxidizer, complete combustion or vaporization, with consequent dispersion and transformation into aerosol smoke.

The following table illustrates test carried out; the method used, or other methods derived therefrom and all comprised in the invention field is applicable to dispersion of various other substances as aerosols.

TABLE

| No. | Solid core | Results observed and photographed |
|---|---|---|
| 1 | Sodium azide | Burns with great violence, aerosol contains unreacted sodium. |
| 2 | Sodium chloride | Burns with violence. |
| 3 | Sodium nitrite | " |
| 4 | Sulfur | Burns with violence, with very bright flame. |
| 5 | Ammonium nitrate | Burns with great violence. |
| 6 | Iodine | Burns with violence, violet fumes. |
| 7 | Silver iodide | Burns with violence. |

The present invention possesses a number of important advantages, in that they provide a solution to difficulties encountered in preparation, dispersion and activation of cloud-precipitating and fog-clearing substances. The use of aerosols which are generated by combustion or explosion of suitable combustible compositions, enables large amounts of active smoke to be dispersed efficiently and at low cost, and eliminates the use of bulky and often expensive dispersing equipment. The variety of additives and possible components of the charges, opens wide fields of application; the ease of storage of units prepared and the possibility of using various sizes of standard charges increases the versatility of the method. The charges are shock proof and can be transported safely, as indicated by a 3000 mile test in automobile, on a batch of 40 units of types described in Examples 1 and 2.

What we claim is:

1. A combustible composition consisting of a readily oxidizable substance selected from the group consisting of aluminum, magnesium, alkali-metals and alkaline earth metals; an oxidizing agent selected from the groups consisting of:

(a) sulphur and sulphur yielding compounds; and (b) organic and inorganic nitrates, alkali-metal and ammonium chlorates and perchlorates;

the molar ratio of the oxidizable substance to the oxidizing agent being between 1.5:1 and 3.5:1 and a stable hygroscopic solid to be dispersed which does not directly participate in the combustion process of the combustible composition, said hygroscopic solid being present in an amount up to 40% of the total weight of the combustible composition, the oxidizable substance, the oxidizing agent and the stable hygroscopic solid having a particle size in the range of from −140 to +270 mesh, and a fused compound which burns initiating the combustion of said composition, whereby during combustion, a finely dispersed aerosol smoke consisting essentially of moderately hygroscopic condensation giant nuclei and a non-hygroscopic gas are simultaneously evolved, said gas acting to disperse said nuclei, thereby generating aerosol smoke and a non-hygroscopic gas which control and modify weather conditions.

2. Combustible compositions according to claim 1, in which the oxidizable substance is aluminum and the oxidizing agent is selected from the group consisting of inorganic and organic nitrates which are stable at room temperature.

3. A combustible composition according to claim 1 in which said stable hygroscopic solid is selected from the group consisting of metal halides.

4. Combustible compositions according to claim 3 in which the oxidizable substance is aluminum, the oxidizing agent is selected from the group consisting of sodium and potassium nitrates, the stable hygroscopic solid is selected from the group consisting of sodium and potassium chloride, and wherein the weight percentage of the chloride in the mixture is in an amount up to 40% of the total weight of the combustible composition.

5. A combustible composition according to claim 1 in which the oxidizing agent, the oxidizable substance and the hygroscopic solid are amalgamated in the presence of a binder selected from the group consisting of organic and inorganic binders, the resulting amalgam being enclosed within a container, thereby forming a combustible candle.

6. A combustible composition according to claim 5 in which the candle has a central core comprising a metal containing substance capable of yielding free metal by thermal decomposition.

7. Combustible compositions according to claim 1 in which the oxidizable substance is aluminum metal and the oxidizing agent is selected from the group consisting of sodium and potassium nitrates, and wherein the molar ratio of aluminum to nitrate is in the range of between 1.5:1 and 3.5:1.

8. A combustible composition according to claim 6 in which the metal of the metal containing substance is selected from the group consisting of sodium metal and potassium metal.

9. A combustible composition according to claim 6 in which the core has an outer casing formed of a polymer.

10. A combustible composition according to claim 6 in which the core has an outer casing formed of aluminum.

11. A combustible composition according to claim 6 in which the core has an outer casing formed of resin impregnated glass fibers.

* * * * *